(12) United States Patent
Sekiya et al.

(10) Patent No.: US 6,344,104 B1
(45) Date of Patent: Feb. 5, 2002

(54) METHOD OF REDUCING SURFACE TACKINESS OF LOW-HARDNESS THERMALLY CONDUCTIVE SILICONE RUBBER SHEET

(75) Inventors: Tokio Sekiya; Akio Nakano, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/226,240

(22) Filed: Jan. 7, 1999

(30) Foreign Application Priority Data

Jan. 9, 1998 (JP) .......................... 10-014841

(51) Int. Cl.[7] .............................. B29C 41/32
(52) U.S. Cl. ................ 156/231; 156/238; 156/326; 264/340; 427/400; 428/420
(58) Field of Search ................ 156/326, 238, 156/231; 264/340; 427/400; 428/420

(56) References Cited

U.S. PATENT DOCUMENTS 4,517,238 A * 5/1985 Mine et al. ............... 428/420

FOREIGN PATENT DOCUMENTS

JP 60-35078 * 2/1985 ............... 156/231

* cited by examiner

Primary Examiner—John J. Gallagher
(74) Attorney, Agent, or Firm—Millen, White, Zelano & Branigan, P.C.

(57) ABSTRACT

A reduction of the surface tackiness of a low-hardness thermally conductive silicone rubber sheet is performed by coating an organohydrogenpolysiloxane oil evenly on a resin film, and pasting together the oil-coated side of the resin film and an addition-cured low-hardness thermally conductive silicone rubber sheet having an Asker C hardness of from 1 to 80. Pasting can be done, for example, by passage between two rolls to supply the organohydrogenpolysiloxane oil to the surface of the silicone rubber sheet. Then, in only the surface part of the sheet, a cross-linking reaction is caused to reduce the tackiness of the sheet surface.

17 Claims, 1 Drawing Sheet

METHOD OF REDUCING SURFACE TACKINESS OF LOW-HARDNESS THERMALLY CONDUCTIVE SILICONE RUBBER SHEET

FIELD OF THE INVENTION

The present invention relates to a method of reducing the surface tackiness of a low-hardness thermally conductive silicone rubber sheet and, more particularly, to a method of reducing evenly the surface tackiness of a low-hardness thermally conductive silicone rubber sheet having strong tackiness so that the sheet surface is uniform throughout.

BACKGROUND OF THE INVENTION

Since heat-generating electronic parts, such as power transistors and thyristors, suffer deterioration in their characteristics due to the heat generated therefrom, measures to dissipate the heat via, e.g., a heat sink attached to such parts or the metallic chassis installed in the devices utilizing them have so far been taken. Therein, a thermal conductive insulation sheet made of a mixture of silicone rubber with a thermally conductive filler has been arranged between the heat-generating electronic parts and the heat sink.

However, conventional cooling means have become insufficient in many cases because the integration density in electronic devices, such as a personal computer, a word processor and a CD-ROM drive, has greatly advanced in recent years to increase the amount of heat generated from the elements of integrated circuits, such as LSI and MPU, disposed in such devices. Particularly in the case of a note-size portable personal computer, very small inner space thereof makes it impossible to install therein a large heat sink or cooling fan. Further, in such recent electronic devices, the integrated circuit elements are mounted on a printed substrate and the material of the substrate is a glass-reinforced epoxy or polyimide resin having inferior thermal conductivity, so that it is impossible to let the heat escape to the substrate via a thermal conductive insulation sheet, in contrast to conventional devices.

Thus, the method of disposing heat-dissipating parts of spontaneous or forced cooling type in the vicinity of integrated circuit elements to transfer the heat generated from the elements to the heat-dissipating parts is adoptable. According to this method, the heat transfer is not good because of roughness on the interface formed by bringing the elements and the heat-dissipating parts into direct contact. Even when the heat-dissipating parts are attached via a thermal conductive insulation sheet, stresses are set up between the elements and the substrate by the thermal expansion of the thermal conductive sheet because the sheet is more or less inferior in flexibility; as a result, there is a certain danger of the device breaking down.

The attachment of heat-dissipating parts to every circuit element requires excessive space to render it difficult to miniaturize the devices. Therefore, the method of cooling the combination of some elements by the use of one unit of heat-dissipating parts is adopted. In particular, MPU of TCP type used in a note-size portable personal computer is lower in height and greater in the amount of heat generated therefrom than other elements, and so the cooling method applied thereto requires careful consideration.

This creates a demand for thermal conductive materials capable of filling various gaps corresponding to the difference in height among elements. Thus, thermal conductive materials having not only high thermal conductivity but also flexibility enough to fit them into gaps have already been proposed.

For instance, Japanese Tokkai Hei 2-196453 (a term "Tokkai" as used herein means an "unexamined published patent application") discloses a sheet having an easily deformable soft silicone layer laminated on a silicone resin layer prepared by forming a mixture comprising a silicone resin and a thermal conductive substance, such as a metal oxide, into a sheet having strength required for handling. This sheet has almost no tackiness on the side of the silicone resin layer provided with the handling strength, but it has very strong tackiness on the side of the easily deformable soft silicone layer. This strong tackiness becomes unnecessary according to the purposes for or the ways in which the sheet is used.

In addition, Japanese Tokkai Hei 7-266356 and Japanese Tokkai Hei 9-1738 disclose the thermal conductive silicone composite sheets having a thickness of 0.4 mm or below which have a sheet or cloth within for reinforcement and, on at least one side, possesses tackiness and Asker Type C hardness of from 5 to 50. Although the tacky side of these sheets is covered with a protective sheet, the tackiness is unnecessary similarly to the above according to the purposes for or the ways in which the sheets are used. Those attempts to lower the hardness of silicone rubber are, as mentioned above, attended with an undesirable increase in tackiness of the sheet surface.

On the other hand, various methods of reducing the surface tackiness of silicone rubber have hitherto been proposed. For instance, there is known the method in which an organohydrogenpolysiloxane oil is coated on the surface of silicone rubber, and made to undergo a cross-linking reaction with only the vinyl groups present in the vicinity of the surface to lessen the surface tackiness. According to this method, however, the oil coated on the silicone rubber surface by the use of a dipping technique or other conventional technique has a drawback of having difficulty in being coated evenly and render the thickness and the hardness nonuniform.

Further, in Japanese Tokkai Sho 50-87459 was proposed the method of conferring mold releasing properties on a silicone rubber molding (condensation curable type) by dipping the molding in a solution containing an alkoxysilane and a metal salt of organic carboxylic acid or an amine compound in an organic solvent.

Furthermore, in Japanese Tokkai Sho 61-261328 was proposed the method of reducing the tackiness by coating the surface of a cross-linkable organopolysiloxane (in a gelled state) having a cone penetration of from 100 to 350 with an organic peroxide or a photoreaction initiator and then irradiating the coating with ultraviolet rays to cause the cross-linking reaction in the surface part alone.

However, those publications are silent on the manners in which the silicone rubber surface was treated actually, and so it was difficult to reduce evenly the tackiness of a silicone rubber surface so that the surface is uniform throughout.

SUMMARY OF THE INVENTION

Therefore, an object of the present invention is to provide a method of reducing evenly the surface tackiness of a low-hardness thermally conductive silicone rubber sheet having strong tackiness so that the sheet surface is uniform throughout.

The aforesaid object of the present invention is attained with a method of reducing the surface tackiness of a low-hardness thermally conductive silicone rubber sheet comprising; coating evenly an organohydrogenpolysiloxane oil on a resin film, pasting the oil-coated side of the resin film to an addition-cured low-hardness thermally conductive silicone rubber sheet having an Asker Type C hardness of from 1 to 80, thereby supplying the organohydrogenpolysiloxane oil to the surface of the silicone rubber sheet, and then causing a cross-linking reaction in the surface part of the sheet.

In accordance with the present method, a resin film and a low-hardness thermally conductive silicone rubber sheet are pasted together after an organohydrogenpolysiloxane oil is coated in a uniform thickness on the resin film, so that the tackiness of the sheet surface can be reduced evenly and the surface treatment for the silicone rubber sheet can be effected by continuous operations to enable mass-production, or a great improvement in productivity.

Figure 1:
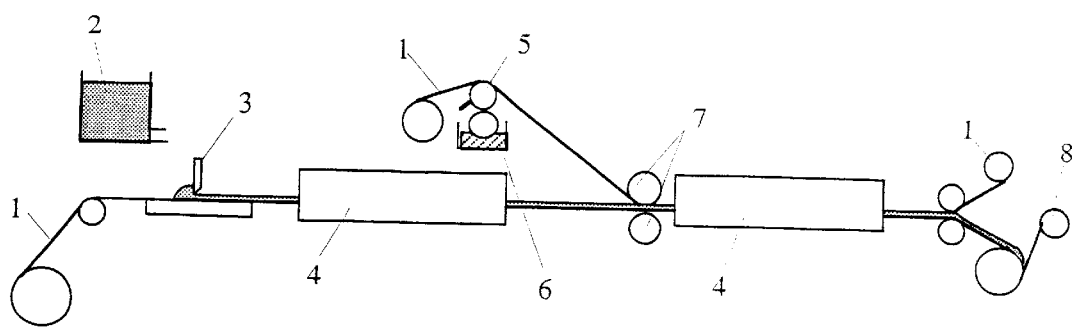
FIG. 1 is a schematic diagram for illustrating an embodiment of the present method comprising processes for producing a low-hardness thermally conductive silicone rubber sheet and processes for reducing the surface tackiness of the sheet produced.

The reference numbers in the FIG. 1 denote the following members respectively:

1. PET film
2. Uncured low-hardness thermally conductive liquid silicone rubber
3. Knife coater
4. Heating oven
5. Kiss coater
6. Organohydrogenpolysiloxane oil
7. Pressure-applying twin rolls
8. Separator

DETAILED DESCRIPTION OF THE INVENTION

The low-hardness thermally conductive silicone rubber used in the present invention has no particular limitation so far as it is an addition-cured low-hardness thermal conductive silicone rubber sheet having Asker Type C hardness of from 1 to 80. However, it is desirable for the present method to use the cured matter of a composition comprising (A) organopoly-siloxanes in which the average number of alkenyl groups per molecule is at least 0.5, (B) organohydrogenpolysiloxanes in which the number of hydrogen atoms attached to silicon atoms is at least two per molecule, (C) a platinum group catalyst and (D) a thermally conductive filler. Of the compositions of such a type, those which have the ratio of the SiH groups in Component (B) to the alkenyl groups in Component (A) [namely SiH/alkenyl ratio] in the range of 0.05/1 to 2/1 by mole and contain Component (D) in a proportion of from 25 to 90 weight % are preferred in particular.

The organopolysiloxanes used as Component (A), wherein the average number of alkenyl groups present is at least 0.5 per molecule, are those represented by an average composition formula $R_nSiO_{(4-n)/2}$ (n=a positive number of from 1.94 to 2.05). As the alkenyl groups therein are cross-linking sites upon curing, the composition cannot be cured basically without including organopolysiloxane molecules in which each at least two alkenyl groups are present.

Therefore, the expression "the average number of alkenyl groups per molecule" as used herein means that the Component (A) is a mixture of organopolysiloxanes having no alkenyl group, those having one alkenyl group per molecule, those having two alkenyl group per molecule and those having more than two alkenyl groups per molecule and the value specified by the present invention is the average number of alkenyl groups per molecule in the total organopolysiloxane molecules. Thus, when the alkenyl group distribution among molecules constituting Component (A) is uniform, the organopolysiloxanes as Component (A) are required to have at least two alkenyl groups per molecule.

R in the foregoing average composition formula represents a substituted or unsubstituted monovalent hydrocarbon group. Examples of such a hydrocarbon group include an alkenyl group, such as a vinyl or allyl group, an alkyl group, such as a methyl, ethyl or propyl group, a cycloalkyl group, such as a cyclopentyl or cyclohexyl group, an aryl group, such as a phenyl or tolyl group, and a halogenated hydrocarbon group formed by replacing a part of hydrogen atoms of the hydrocarbon group as recited above by chlorine or fluorine atom(s). In general, the organopolysiloxanes suitable for Component (A) are organopolysiloxanes the main chain of which is constituted of dimemthylsiloxane units or those having the main chain constituted of dimethylsiloxane units a part of which vinyl, phenyl, trifluoropropyl or/and groups as recited above are introduced into.

Further, it is desirable for such organopolysiloxanes that the molecular chain ends thereof be blocked with triorganosilyl groups. Examples of such a triorganosilyl group include trimethylsilyl, dimethylvinylsilyl and trivinylsilyl groups. The suitable viscosity of Component (A) is not higher than 100,000 cs at 25° C., especially from 500 to 30,000 cs at 25° C. When the viscosity is too high, the resulting composition is liable to lower the workability upon molding due to its poor fluidity.

The organohydrogenpolysiloxane as Component (B) is constituted of straight-chain, branched or cyclic molecules which each contain at least two hydrogen atoms attached directly to silicon atoms. This Component (B) undergoes the addition reaction with the alkenyl groups in Component (A) to function as a cross-linking agent. The amount of Component (B) added is generally from 0.05 to 2 moles, preferably from 0.1 to 1 mole, per mole of alkenyl group in Component (A).

When the organohydrogenpolysiloxane as Component (B) is less than 0.05 mole in the amount added, the cross-linking density is too low to ensure sufficient strength in the cured composition; as a result, it is difficult to form the cured composition in the intended shape. When the amount of Component (B) added is greater than 2 moles, almost all the alkenyl groups undergoes the cross-linking reaction, and so it is hard to leave alkenyl groups in the cured composition; as a result, even when the surface of a low-hardness thermally conductive silicone rubber sheet is treated with an organohydrogensiloxane oil after the curing, the surface tackiness cannot be lowered.

The platinum group catalyst as Component (C) is a catalyst for promoting the addition reaction. Examples of such a catalyst include platinum black, chloroplatinic acid, an alcohol-modified chloroplatinic acid, a chloroplatinic acid-olefin complex, a chloroplatinic acid-vinylsiloxane complex, and a chloroplatinic acid-acethylene alcohol complex. The amount of Component (C) added, though determined depending on the desired curing speed, is generally from 0.1 to 1,000 ppm, preferably from 1 to 200 ppm, based on platinum to Component (A).

The thermally conductive filler as Component (D) can be selected from the powders of aluminum oxide, boron nitride, aluminum nitride, zinc oxide, silicon carbide, quartz, aluminum hydroxide, graphite and so on. Such a powder is added in a proportion of from 25 to 90 weight % to the total components of the composition. When the proportion is less than 25 weight %, it is much apprehended that the resulting composition is insufficient in thermal conductivity; while, when it is increased beyond 90 weight %, the resulting composition comes to have poor fluidity and the cured matter thereof is apt to be hard and lose the flexibility.

To the composition as mentioned above can be added other ingredients, e.g., vinyl group-containing organopolysiloxanes such as methylvinylcyclotetrasiloxane, triallyl cyanurate, acetylene alcohol and siloxane-modified acetylene alcohols, for the purpose of controlling the curing speed and storage stability of the composition. In addition, reinforcing silica, a coloring agent, a heat resistance improver, a contact aid and so on may be added so far as the addition thereof does not mar the effects of the present method.

The hardness of a low-hardness thermally conductive silicone rubber sheet prepared by curing the composition as mentioned above is from 1 to 80, preferably from 5 to 50, measured with an Asker Type C hardness tester. The term "Asker Type C hardness" as used herein is defined as the hardness measured with an Asker Type C hardness tester, or a hardness tester of spring type, at a state that two 6 mm-thick sheets are superposed upon each other, based on SRIS 1010 (Standard set up by The Society of Rubber Industry, Japan) and JIS 6050.

When the Asker Type C hardness is less than 1, the rubber layer is poor in strength and hard to mold, thereby lowering the mass-productivity of rubber sheet. When the hardness is greater than 80, on the other hand, the rubber sheet is insufficient in flexibility, and so it is hard to come into close contact with heat-generating parts and follow their shape. For the purpose of ensuring both flexibility and strength in a silicone rubber sheet, the cloth or unwoven cloth of glass, polyester, nylon or so on, or the resin film made from polyimide, nylon, polyester or the like may be inserted as a reinforcer in a low-hardness thermally conductive rubber sheet. By this insertion, the rubber sheet can have improved strength and can be inhibited from stretching; as a result, the sheet is easy to handle to enhance the workability.

The formation of a low-hardness thermally conductive silicone rubber sheet can be effected using the following methods.

Forming with Mold: After an uncured liquid composition is poured into a metal mold, the metal mold is clamped, and then pressure and heat are applied to the liquid composition by means of a hot presser to achieve the curing of the composition.

Injection Molding: By the use of an injection molding machine, an uncured liquid composition is injected from a nozzle into a hot metal mold till the cavity of the mold is filled therewith. After curing the composition, the mold is unlocked and the sheet formed is taken out.

Forming by Coating: A separator film (e.g., PET film) is continuously fed to a coating apparatus, and thereon an uncured liquid composition is coated in a definite thickness by means of a knife coater or the like, and then passed through a heating oven to effect the curing thereof.

Even if direct coating of an organohydrogenpoly-siloxane oil on a low-hardness thermally conductive silicone rubber sheet is attempted with the intention of lowering the surface tackiness of the silicone rubber sheet by the cross-linking reaction caused between the organohydrogenpolysiloxane oil coated and the silicone rubber in the vicinity of the sheet surface alone, it is difficult to evenly coat oil in a uniform layer because the sheet is soft.

In the invention, therefore, an organohydrogenpolysiloxane oil is coated first in a uniform layer on a resin film surface by the use of a coating apparatus, and then the oil-coated face of the resin film is brought into contact with a cured low-hardness thermally conductive silicone rubber sheet and passed between two press rolls, thereby pasting the film and the sheet together without leaving any space between them. Further, the film and the sheet pasted together is subjected to a heat treatment in a heating oven in a state that the organohydrogenpolysiloxane oil is supplied to the silicone rubber sheet surface. By this heat treatment, the cross-linking reaction at the rubber sheet surface is promoted to lower the surface tackiness of the sheet in a short time. In this case, the depth to which the action of the tackiness reducing treatment extends from the surface of the silicone rubber sheet can be controlled by the amount of organohydrogenpolysiloxane oil coated on the resin film.

Further, the aforementioned steps constituting the present method can be carried out by continuous operations, so that the present method can ensure high efficiency in production.

Examples of an organohydrogenpolysiloxane oil which can be coated on a resin film include the same organohydrogen-polysiloxanes as employed for Component (B) of a low-hardness thermally conductive silicone rubber sheet. From a viewpoint of suitability for coating apparatus, it is desirable to use an oil having a viscosity of no higher than 100,000 cs, preferably from 10 to 30,000 cs, at 25° C.

The resin film on which the oil is coated can be selected properly from films having a thermal deformation temperature of 100° C. or above to withstand the heating treatment temperature after pasting, such as PET, PBT and polycarbonate films.

As the coating apparatus used for coating an organohydrogenpolysiloxane oil on a resin film in a uniform thickness, a coater of post-metering type, such as a blade coater, a rod coater, a knife coater or a squeeze coater, or a coater of pre-metering type, such as a reverse roll coater, a gravure coater, a kiss coater or a spray coater, can be employed.

The low-hardness thermally conductive silicone rubber sheet which is reduced in surface tackiness according to the present invention can bring about an improvement in workability because of its ease in handling, so that it is well-suited for heat reduction of integrated circuit elements, such as LSI and MPU, composing electronic devices, such as personal computers, word processors and CD-ROM drives.

The present invention will now be illustrated in greater detail by reference to the following examples. However, the invention should not be construed as being limited to these examples.

The entire disclosure of all applications, patents and publications, cited above and below, and of corresponding Japanese application No. Hei 10-14841, filed Jan. 9, 1998, is hereby incorporated by reference.

EXAMPLE 1

A mixture of 27 parts by weight of a vinyl group-containing dimethylpolysiloxane which was blocked with dimethylvinylsiloxy groups at the both ends and had a viscosity of 800 cs at 25° C., 40 parts by weight of a dimethylpolysiloxane which was blocked with trimethylsiloxy groups at the both ends and had a viscosity of 800 cs at 25° C., 33 parts by weight of a vinyl group-containing dimethyl-polysiloxane which was blocked with a trimethylsiloxy group at one end and with a dimethylvinylsiloxy group at the other end and had a viscosity of 800 cs at 25°

C. and 350 parts by weight of an aluminum oxide powder (AS-30, trade name, produced by Showa Denko Co., Ltd.) was kneaded for 1 hour at 150° C.

After cooling, the kneaded matter was mixed homogeneously with 0.015 parts by weight of ethynyl cyclohexanol, and then admixed with 0.05 parts by weight of a chloroplatinic acid-vinylsiloxane complex (platinum concentration: 1%), and further mixed homogeneously with 1.0 parts by weight of an organohydrogenpolysiloxane containing 0.54 mole % of hydrogen atoms attached directly to silicon atoms and having a viscosity of 8 cs at 25° C. Thus, the addition-curable liquid composition for low-hardness thermal conductive silicone rubber was prepared.

This composition was subjected to mold forming under a condition of 10 minutes' heating at 150° C., thereby making a 6 mm-thick sheet. The measured value of Asker Type C hardness of this sheet was 8.

Separately, a 0.2 mm-thick, glass cloth-made, reinforcing and thermal conductive insulation sheet (TC-20CG, trade name, produced by Shin-Etsu Chemical Co., Ltd.) was placed in a metal mold, and the foregoing composition was poured into the mold to be spread over the insulation sheet. Then, the mold was clamped and heated for 10 minutes at 150° C. Thus, a TC-20CG united low-hardness thermally conductive silicone rubber sheet having a total thickness of 2 mm was obtained. This sheet had very strong tackiness on the silicone rubber side. By the 180 degree peel test using a stainless plate, the adhesive strength was found to be 85 gf/25 mm (width) on the silicone rubber side.

Further, the organohydrogenpolysiloxane oil of formula $(CH_3)_3SiO[SiHCH_3O]_{38}Si(CH_3)_3$ was coated evenly in a thickness of 15 µm on a 100 µm-thick PET film by means of a rod coater. Then, the oil-coated PET film and the low-hardness thermally conductive silicone rubber sheet were pasted together by bringing them into face-to-face contact so that no air remained at the interface, and then heated for 20 minutes at 80° C. Thus, the silicone rubber sheet surface was reduced in tackiness. Specifically, the adhesive strength of the thus processed silicone rubber sheet surface was found to be 12 gf/25 mm (width) by the 180 degree peel test using a stainless plate.

EXAMPLE 2 AND COMPARATIVE EXAMPLE 1

A mixture of 100 parts by weight of a methylvinylpolysiloxane constituted of 95 mole % of dimethylsiloxane units and 5 mole % of methylvinylsiloxane units and having a viscosity of 6,000 cs at 25° C. with 400 parts by weight of the same aluminum oxide powder as used in Example 1 (AS-30) was kneaded for 1 hour at 150° C.

After cooling, the kneaded matter was mixed homogeneously with 0.2 parts by weight of ethynyl cyclohexanol, and then admixed with 0.6 parts by weight of a chloroplatinic acid-vinylsiloxane complex (platinum concentration: 1%), and further mixed homogeneously with 5 parts by weight of an organohydrogenpolysiloxane of formula $HSi(CH_3)_2O[Si(CH_3)_2O]_{18}Si(CH_3)_2H$. Thus, the addition-curable liquid composition for low-hardness thermal conductive silicone rubber was prepared.

This composition was subjected to mold forming under 10 minutes' heating at 150° C., and thereby it was formed into a 6 mm-thick sheet. The measured value of Asker C hardness of this sheet was 24.

Separately, by the use of a continuously forming apparatus having the structure as shown in FIG. 1, the foregoing composition was coated in a thickness of 1 mm on a 100 µm-thick PET film with a knife coater and cured by 6 minutes' passage through a heating oven kept at 150° C.

Further, the organohydrogenpolysiloxane oil of formula $(CH_3)_3SiO[SiHCH_3O]_{38}Si(CH_3)_3$ was coated evenly in a thickness of 10 µm on a 60 µm-thick PET film by means of a squeeze kiss roll coater, and then the thus oil-coated PET film was passed between two rolls together with the low-hardness thermally conductive silicone rubber sheet formed above. By this passage pressure, the film and the sheet were pasted together.

Furthermore, the pasted matter underwent the heat treatment of 6 minutes' passage through a heating oven kept at 100° C., and thereby the tackiness of the sheet surface was reduced. After peeling the 60 µm-thick PET film off the sheet, the sheet was wound up while interposing a polyethylene-made separator.

The low-hardness thermally conductive silicone rubber sheet thus obtained had strong tackiness on one side (Comparative Example 1) and weak tackiness on the other side (Example 2). By carrying out the 180 degree peel test using a stainless plate, the adhesive strength of the silicone rubber sheet was found to be 54 gf/25 mm (width) on the side strong in tackiness and 4 gf/25 mm (width) on the side weak in tackiness.

COMPARATIVE EXAMPLE 2

The organohydrogenpolysiloxane oil represented by formula $(CH_3)_3SiO[SiHCH_3O]_{38}Si(CH_3)_3$ was coated directly on the tacky surface of the same TC-20CG united low-hardness thermally conductive silicone rubber sheet as prepared in Example 1 by means of a rod coater. Then, the resulting sheet was heated for 20 minutes at 100° C. to reduce the tackiness of the silicone rubber sheet surface. The adhesive strength of the thus tackiness-reduced surface was 3 gf/25 mm (width) according to the 180 degree peel test using a stainless plate. In the direct coating, however, the silicone rubber sheet caused deformation due to its softness, so that it was impossible to control the coverage of the organohydrogenpoly-siloxane oil. Thus, the organohydrogenpolysiloxane oil was coated in a large amount, and thereby it penetrated into the inside of the silicone rubber sheet to cause a substantial raise in hardness of the sheet.

What is claimed is:

1. A method of reducing surface tackiness of a low-hardness thermally conductive silicone rubber sheet comprising;

coating evenly an organohydrogenpolysiloxane oil on a resin film, pasting the oil-coated side of the resin film on an addition-cured low hardness thermally conductive silicone rubber sheet having an Asker C hardness of from 1 to 80, thereby supplying the organohydrogenpolysiloxane oil to the surface of the silicone rubber sheet, wherein the resin film has a thermal deformation temperature of no lower than 100 ° C., and causing a cross-linking reaction in the surface part of the sheet.

2. A method according to claim 1, wherein said addition-cured low-hardness thermally conductive silicone rubber sheet is formed from a cured thermally conductive silicone rubber composition, said composition comprising:

(A) organopolysiloxanes wherein the average number of alkenyl groups per molecule is at least 0.5, (B) organohydrogenpolysiloxanes wherein the number of hydrogen atoms attached to silicon atoms is at least two per molecule, (C) a platinum group catalyst, and (D) a thermally conductive filler; and wherein the mole ratio of SiH groups in Component (B) to alkenyl groups in Component (A) is 0.05/1 to 2/1 and the thermally conductive filler as Component (D) is contained in a proportion of 25 to 90 weight % of the total weight of the components.

3. A method according to claim 1, wherein the organohydrogenpolysiloxane oil coated on the resin film is an organohydrogenpolysiloxane having at least two Si-H bonds per molecule and a viscosity of 100,000 cs or below at 25° C.

4. A method according to claim 1, wherein the pasting of resin film to the silicone rubber sheet is carried out by passage between two rolls and the cross-linking reaction in the surface part of the silicone rubber sheet is promoted by the heat treatment in a heating oven.

5. A method according to claim 1, wherein said low-hardness thermally conductive silicone rubber sheet has an Asker Type C hardness of 5–50.

6. A method according to claim 1, wherein said addition-cured low-hardness thermally conductive silicone rubber sheet is formed from a cured thermally conductive silicone rubber composition, said composition comprising:
  (A) organopolysiloxanes wherein the average number of alkenyl groups per molecule is at least 0.5,
  (B) organohydrogenpolysiloxanes wherein the number of hydrogen atoms attached to silicon atoms is at least two per molecule,
  (C) a platinum group catalyst, and
  (D) a thermally conductive filler.

7. A method according to claim 2, wherein the organopolysiloxanes of component (A) are represented by average compositional formula $R_n SiO_{(4-n)/2}$, wherein n is a positive number of 1.94–2.05, and R is vinyl, allyl, methyl, ethyl propyl, cyclopentyl, cyclohexyl, phenyl, or tolyl, wherein in each case one or more hydrogen atoms are, optionally, replaced by chlorine or fluorine atoms.

8. A method according to claim 6, wherein the organopolysiloxanes of component (A) are represented by average compositional formula $R_n SiO_{(4-n)/2}$, wherein n is a positive number of 1.94–2.05, and R is vinyl, allyl, methyl, ethyl propyl, cyclopentyl, cyclohexyl, phenyl, or tolyl, wherein in each case one or more hydrogen atoms are, optionally, replaced by chlorine or fluorine atoms.

9. A method according to claim 2, wherein the viscosity of component (A) is not higher than 100,000 cs at 25° C.

10. A method according to claim 2, wherein the mole ratio of SiH groups in Component (B) to alkenyl groups in Component (A) is 0.1 to 1.

11. A method according to claim 2, wherein Component (C) is platinum black, chloroplatinic acid, an alcohol-modified chloroplatinic acid, a chloroplatinic acid-olefin complex, a chloroplatinic acid-vinylsiloxane complex, or a chloroplatinic acid-acetylene alcohol complex.

12. A method according to claim 2, wherein the amount of Component (C) is 0.1–1000 ppm, based on the amount of Component (A).

13. A method according to claim 2, wherein Component (D) is aluminum oxide, boron nitride, aluminum nitride, zinc oxide, silicon carbide, quartz, aluminum hydroxide or graphite.

14. A method according to claim 6, wherein said silicon rubber sheet has an Asker Type C hardness of 5–50.

15. A method according to claim 3, wherein said organohydrogenpolysiloxane oil has a viscosity of 10–30,000 cs at 25° C.

16. A method according to claim 2, wherein the viscoscity of Component (A) is 500–30,000 cs at 25° C.

17. A method according to claim 1, wherein said resin film is a PET film, a PBT film, or a polycarbonate film.

* * * * *